(12) United States Patent
Shin

(10) Patent No.: US 7,751,116 B2
(45) Date of Patent: Jul. 6, 2010

(54) FLEXIBLE DISPLAY

(75) Inventor: Kwang Hoon Shin, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 85 days.

(21) Appl. No.: 11/646,665

(22) Filed: Dec. 28, 2006

(65) Prior Publication Data

US 2007/0171345 A1 Jul. 26, 2007

(30) Foreign Application Priority Data

Dec. 28, 2005 (KR) .................. 10-2005-0132155

(51) Int. Cl.
*G02B 26/00* (2006.01)
(52) U.S. Cl. ........................ 359/296; 359/265
(58) Field of Classification Search .......... 359/296, 359/265
See application file for complete search history.

(56) References Cited

U.S. PATENT DOCUMENTS

| 5,956,170 | A  | * | 9/1999  | Miyagaki et al. ............ 359/275 |
| 2004/0218133 | A1 | * | 11/2004 | Park et al. .................... 349/153 |
| 2005/0151709 | A1 | * | 7/2005  | Jacobson et al. .............. 345/84 |
| 2007/0002424 | A1 | * | 1/2007  | Hirota et al. ................ 359/265 |

* cited by examiner

*Primary Examiner*—Jordan M. Schwartz
*Assistant Examiner*—James C Jones
(74) *Attorney, Agent, or Firm*—Brinks Hofer Gilson & Lione

(57) ABSTRACT

A flexible display of a reflection type is disclosed. An electrolyte layer with a relatively high polarity and a non-electrolyte layer with a relatively low polarity are arranged between two electrodes such that an image is displayed in accordance with movements of the electrolyte layer and non-electrolyte layer caused by an electric field applied to the layers. A reflection plate is arranged on a lower surface of the display such that the color of the image may be modified in accordance with a change in the color of the reflection plate.

15 Claims, 2 Drawing Sheets

FLEXIBLE DISPLAY

This application claims priority to Korean Patent Application No. 10-2005-0132155, filed on Dec. 28, 2005, which is incorporated by herein.

BACKGROUND

1. Field of the Disclosure

The present disclosure relates to an electrophoretic display (EPD) device, and more particularly, to a flexible display which can be manufactured at lower temperatures with a simple structure for colorfully displaying an image.

2. Discussion of the Related Art

Displays are commonly used as a visual information transfer medium as society has become more information-dependent. Displays are being manufactured to have lower power consumption, and be thinner, lighter and have a higher picture quality.

Displays may be classified as an emission type display, in which the display itself emits light and a non-emission type display, in which the display itself does not emit light. Examples of an emission type display may be a cathode ray tube (CRT) such as a Braun tube, an electroluminescent (EL) device, a vacuum fluorescent display, and a plasma display panel. An example of a non-emission type display may be a liquid crystal display (LCD).

A flexible display, which can be folded or rolled without any damage, may become common in display fields. Flexible displays may offer a benefit of being more reliable and less likely to break. Although there are currently various obstacles in realizing a fully-functional and cost-effective flexible display, it may be possible to apply the technique of creating a flexible display to thin film transistor (TFT) LCDs, organic light emitting diodes (OLEDs), and EPDs, as the technique becomes more advanced. The flexible display technique may be difficult to apply to the above-mentioned displays which have a complex structure.

A flexible display may also be referred to as a "rollable display" or "foldable display". Such a flexible display is formed on or implemented on a thin substrate made of a material that it is not damaged even when being folded or rolled, such as a plastic or paper. A flexible display may be suited to organic EL devices and LCD devices which have a thickness of approximately 1 mm or less.

Organic EL devices exhibit good visibility in dark areas or in areas where external light is incident because organic EL devices emit light. Organic EL devices also have a relatively fast response time making it a good display of moving images. An organic EL device may also be manufactured with a slimness or thin profile used for various mobile devices such as mobile phones because it can be designed to have a thin structure.

In order to implement a flexible display using such an organic EL device, a flexible substrate is made of a material that is flexible, such as plastic. However, flexible displays according to the related art have several problems. An organic EL device manufactured using a flexible substrate such as a plastic substrate is limited in application of the plastic substrate because of a high-temperature process required for manufacture of the organic EL device. Plastic substrates have a melting point lower than that of a glass substrate. Accordingly, a plastic substrate may melt in the manufacture of the display device. Also, the manufacturing process becomes complex because of a larger number of patterns used for driving of the organic EL device.

Recently, a new method capable of applying the plastic substrate to the high-temperature process has been proposed wherein the high-temperature process is carried out under the condition in which a glass substrate is attached to the plastic substrate, and the glass substrate is then detached from the plastic substrate. In this method, however, the process for attaching the glass substrate to the plastic substrate is complex. It is also necessary to perform a plurality of lamination processes. Accordingly, there are drawbacks of possibility of defects and a degradation in productivity.

BRIEF SUMMARY

Accordingly, the present disclosure is related to a flexible display that substantially obviates one or more problems due to limitations and disadvantages of the related art.

In a first aspect, a flexible display includes a first electrode disposed on a first substrate and a second substrate disposed adjacent the first substrate. A second electrode and a black matrix are disposed on a surface of the second substrate. A transparent electrolyte layer and an opaque non-electrolyte layer are disposed between the two substrates.

In a second aspect, a flexible display includes a first electrode disposed on a flexible substrate. A transparent insulating layer is disposed adjacent an upper surface of the flexible substrate. A counter substrate is disposed adjacent the flexible substrate. A second electrode and a black matrix are disposed on a surface of the counter substrate adjacent the flexible substrate. A transparent electrolyte layer and an opaque non-electrolyte layer are disposed between the flexible substrate and the counter substrate. A reflection plate is disposed adjacent a lower surface of the flexible substrate.

In a third aspect, a liquid crystal display includes a first electrode disposed on a first substrate and a second electrode disposed on a second substrate. The second substrate is disposed adjacent the first substrate. A transparent electrolyte layer and an opaque non-electrolyte layer are disposed between the first and second substrates.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims and be defined by the following claims. Nothing in this section should be taken as a limitation on those claims. Further aspects and advantages are discussed below in conjunction with the embodiments.

It is to be understood that both the foregoing general description and the following detailed description of the present invention are exemplary and explanatory and are intended to provide further explanation of the invention as claimed.

BRIEF DESCRIPTION OF THE DRAWINGS

The system and/or method may be better understood with reference to the following drawings and description. Non-limiting and non-exhaustive embodiments are described with reference to the following drawings. The components in the figures are not necessarily to scale, emphasis instead being placed upon illustrating the principles of the invention. In the figures, like referenced numerals designate corresponding parts throughout the different views.

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
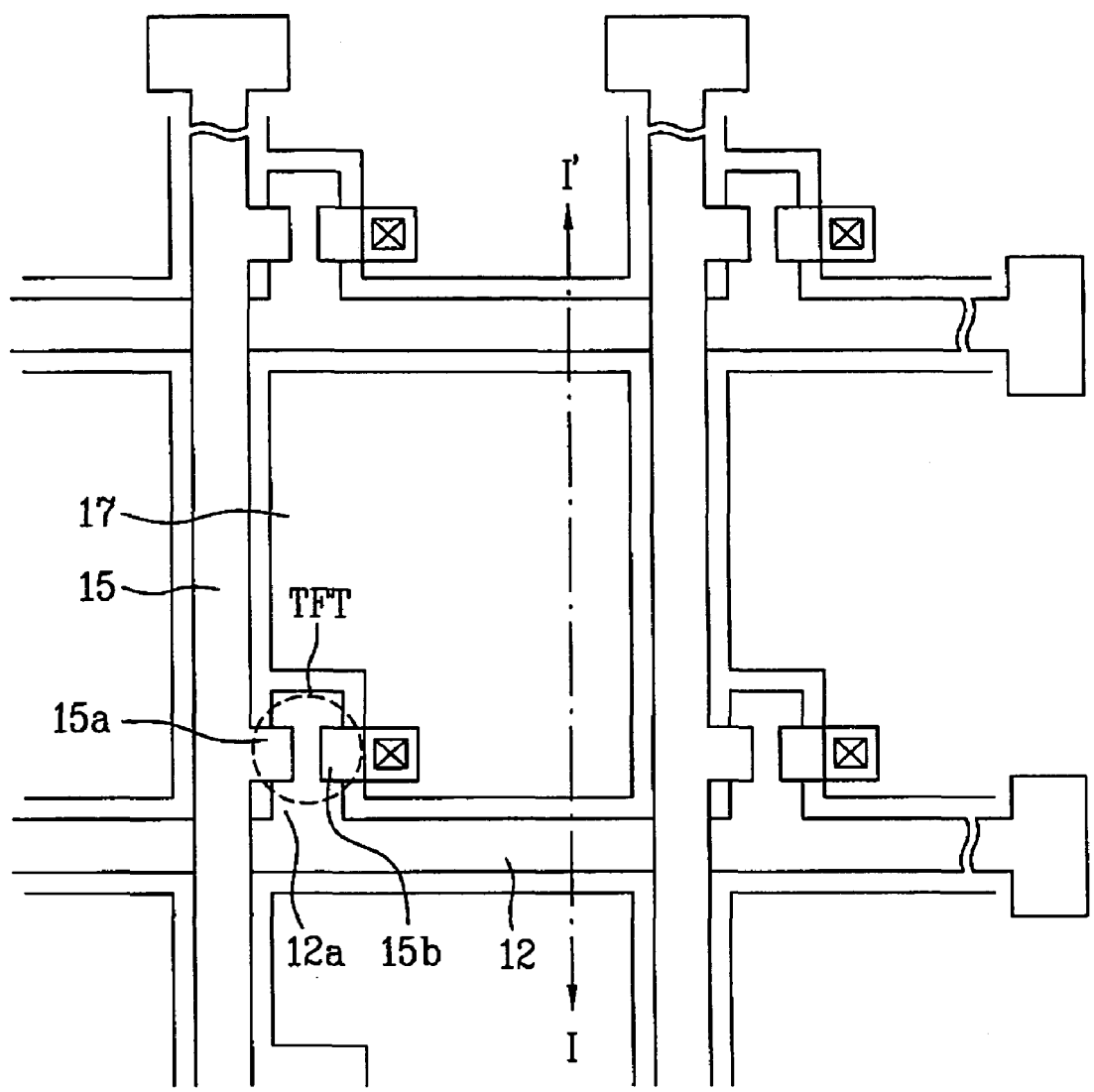
FIG. 1 is a plan view of a flexible display according to one embodiment.

Reference will now be made in detail to the embodiments of the present disclosure associated with a flexible display, some examples of which are illustrated in the drawings. Wherever possible, the same reference numbers will be used throughout the drawings to refer to the same or like parts. Herein, the phrase "coupled with" is defined to mean directly connected to or indirectly connected through one or more intermediate components. Such intermediate components may include both hardware and software based components.

Figure 2:
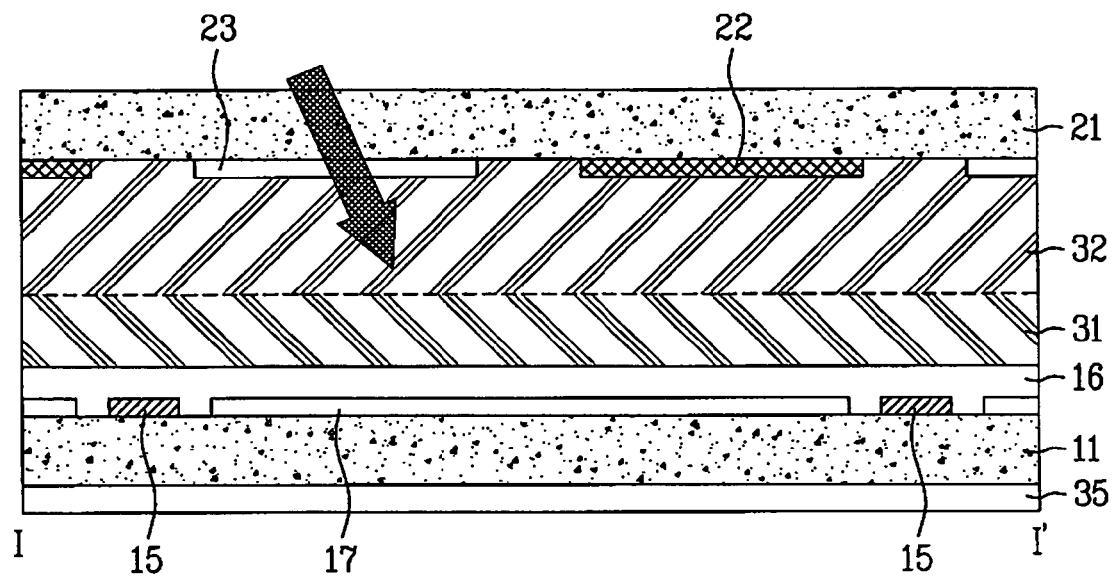
FIG. 2 is a cross-sectional view taken along the line I-I' of FIG. 1, illustrating an embodiment in which no electric field is applied to the flexible display.
Figure 3:
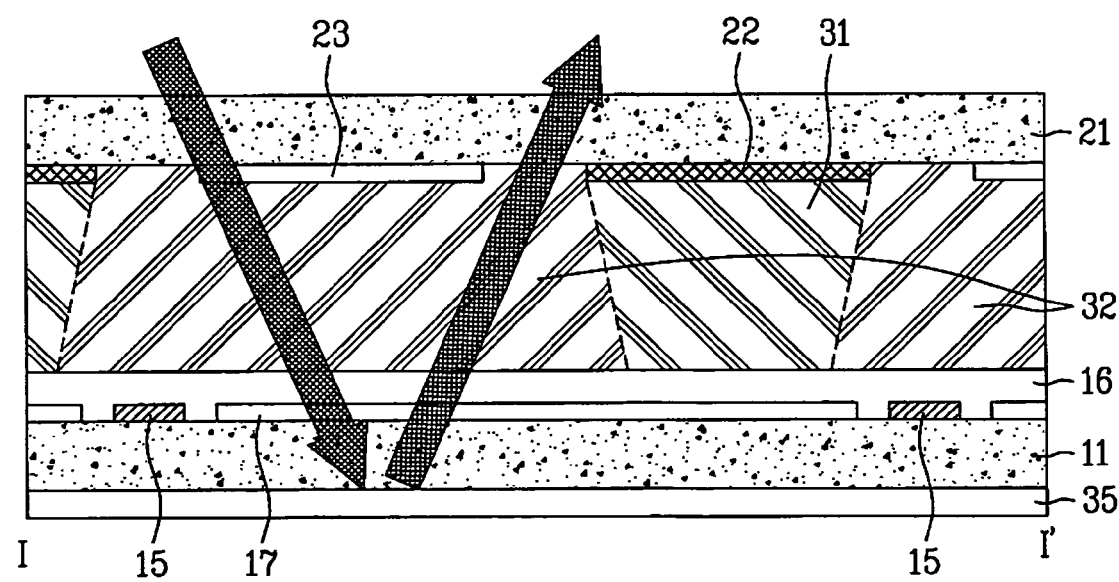
FIG. 3 is a cross-sectional view taken along the line I-I' of FIG. 1, illustrating an embodiment in which an electric field is applied to the flexible display.

FIG. 1 is a plan view of a flexible display according to one embodiment. FIG. 2 is a cross-sectional view taken along the line I-I' of FIG. 1, illustrating an embodiment in which no electric field has been applied to the flexible display. FIG. 3 is a cross-sectional view taken along the line I-I' of FIG. 1, illustrating an embodiment in which an electric field is applied to the flexible display.

As shown in FIGS. 1 and 2, the flexible display according to one embodiment includes a flexible substrate 11, provided at a lower surface thereof. A first electrode 17, and a counter substrate 21 are arranged to face the flexible substrate 11 and provided with second electrodes 23 and a black matrix 22. A reflection plate 35 is also arranged on the lower surface of the flexible substrate 11 such that the flexible display may be driven in a reflection mode.

Gate lines 12 and data lines 15 are formed on or disposed on the flexible substrate 11, in order to transfer various signals for actively driving a plurality of thin film transistors (TFTs). The gate lines 12 and data lines 15 are arranged to intersect one other, in order to define pixels of the display. A scanning signal is transferred to the gate lines 12, whereas an image data signal is transferred to the data lines 15.

The TFTs are arranged in respective pixels, together with the first electrodes 17 which may be substantially transparent. Each TFT is positioned at an intersection between an associated gate line 12 and an associated data line 15, to control the polarity of a voltage applied to the associated first electrode 17. A transparent insulating layer 16 may also be disposed over the entire upper surface of the flexible substrate 11 including the first electrodes 17. The transparent insulating layer 16 may be made of a hydrophobic material.

Each TFT includes a gate electrode 12a branched from the associated gate line 12, a gate insulating layer (not shown) disposed over the gate electrode 12a, and a semiconductor layer (not shown) laminated over the gate electrode 12a. Source electrodes 15a and drain electrodes 15b are branched from the associated data line 15 such that they are arranged on the semiconductor layer. The drain electrode 15b is electrically connected to the associated first electrode 17 which may function as a pixel electrode.

The reflection plate 35, which is disposed on the lower surface of the flexible substrate 11, is exposed to an oxidation environment because it is formed on the outer substrate surface. Accordingly, the reflection plate 35 should not be made of a metal which is oxidizable and has limited flexibility. The reflection plate 35 may be made of a material having flexibility, such as an aluminum foil exhibiting a crack stability. Because the reflection plate 35 is made of a flexible material, it is possible to further increase the flexibility of the flexible display.

When the reflection plate 35 is made of a material having a certain color, it is possible to color the displayed image. Accordingly, it may be possible to display a monochromic image by attaching a reflection plate having a single color to the entire panel portion of the display. Alternatively, it is possible to display a colorful image by attaching a reflection plate having different colors, for example, red (R), green (G), and blue (B), for different sub-pixels of each pixel, to the panel portion of the display.

The second electrodes 23, may be disposed on the counter substrate 21, together with the black matrix 22, and arranged to be spaced apart from the black matrix 22 by a predetermined distance. The region where each of the second electrodes 23 are formed corresponds to an image display region, through which external natural light passes. The region where the black matrix 22 is formed corresponds to an image non-display region which shields external natural light.

The second electrodes 23 are integrated together, so that they receive the same voltage externally of the active region. When a voltage is applied to each second electrode 23, a vertical electric field is established between the second electrode 23 and a corresponding first electrode 17 associated with the second electrode 23. In other words, one of the second electrodes 23 may be associated with or correspond to one of the first electrodes 17. The first and second electrodes 17 and 23 are made of a transparent conductive material, for example, indium tin oxide (ITO) or indium zinc oxide (IZO). The black matrix 22 may be made of a light shieldable material such as Cr.

The flexible substrate 11 and counter substrate 21, may be assembled to face each other. A transparent electrolyte layer 31 and an opaque non-electrolyte layer 32 are sealed between the substrates 11 and 21. The transparent electrolyte layer 31 may be made of an electrolyte material having a polarity, such as an aqueous solution. The opaque non-electrolyte layer 32 may be made of a non-electrolyte material having no polarity, such as oil. Since the transparent insulating layer 16 on the flexible substrate 11 is made of a hydrophobic material, the transparent electrolyte layer 31 tends to move away from the transparent insulating layer 16. As a result, the transparent electrolyte layer 31 is positioned over the opaque non-electrolyte material 32 on the transparent insulating layer 16. Since the opaque non-electrolyte 32 shields external natural light, as shown in FIG. 2, an improved black level of the flexible display is realized.

When a voltage is applied to the flexible display, an electric field is established between the first and second electrodes 17 and 23, whereas no electric field is established between the first electrode 17 and the black matrix 22. FIG. 3 is a cross-sectional view taken along the line I-I' of FIG. 1, illustrating an embodiment in which an electric field is applied to the flexible display. As a result, the transparent electrolyte layer 31, which has a relatively high polarity, moves to a region defined between the first and second electrodes 17 and 23, namely, a region where the electric field has been established. Accordingly, the opaque non-electrolyte layer 32, which has a relatively low polarity, is pushed to a region defined between the first electrode 17 and the black matrix 22. This phenomenon is called an "electro-wetting effect". In this state, external natural light can reach the reflection plate 35 after passing through the transparent electrolyte layer 31. The light is then reflected from the transparent plate 35 in the form of an image. Thus, an image is displayed. The light, which is white light, is then colored by the color of the reflection plate 35.

Accordingly, the flexible display of one embodiment is a reflection type display wherein an electrolyte layer having a relatively high polarity and a non-electrolyte layer having a relatively low polarity are arranged between two electrodes. An image is displayed in accordance with movements of the electrolyte layer and non-electrolyte layer caused by an electric field applied to the layers. A reflection plate representing a color is arranged on a lower surface of the display such that the color of the image may be changed in accordance with a change in the color represented by the reflection plate.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As apparent from the above description, the flexible display has the following effects. First, it is possible to easily color a displayed image by attaching a reflection plate having a certain color to the lower surface of the flexible substrate. In this case, it is possible to display a monochromic image by attaching a reflection plate having a single color to the entire panel portion of the display. Alternatively, it is possible to display a colorful image by attaching a reflection plate having different colors for different sub-pixels of each pixel to the panel portion of the display.

In addition, it is possible to further enhance the flexibility of the flexible display by forming the reflection plate using a flexible material. It is also possible to eliminate the possibility of formation of cracks, as compared to conventional cases using a reflection plate made of a metal. Accordingly, the display has an enhanced durability, and thus, an improved reliability. Thirdly, it is possible to colorfully display an image, using a reflection plate having portions with different colors, as compared to conventional flexible displays capable of displaying only black and white. Finally, it is unnecessary to additionally use color filter layers, for display of a colorful image. Accordingly, it is possible to realize display of a colorful image while simplifying the manufacturing process.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A flexible display comprising:
   a first electrode disposed on a first substrate;
   a second substrate disposed adjacent the first substrate;
   a second electrode and a black matrix disposed on a surface of the second substrate;
   a transparent electrolyte layer and an opaque non-electrolyte layer disposed between the two substrates, wherein the transparent electrolyte layer passes an external light and the non-electrolyte layer shields the external light; and
   a reflection plate disposed on a lower surface of the first substrate, wherein the reflection plate comprises different colors that correspond with sub-pixels.

2. The flexible display according to claim 1, wherein the electrolyte layer comprises an aqueous solution.

3. The flexible display according to claim 1, wherein the non-electrolyte layer comprises oil.

4. The flexible display according to claim 1, wherein the first and second electrodes comprise a transparent conductive material.

5. The flexible display according to claim 1, further comprising a transparent insulating layer covering substantially all of an upper surface of the first substrate including the first electrode.

6. The flexible display according to claim 5, wherein the transparent insulating material comprises a hydrophobic material.

7. The flexible display according to claim 1, wherein the first substrate is flexible.

8. The flexible display according to claim 1, wherein the second substrate is transparent and flexible.

9. The flexible display according to claim 1, wherein an image is displayed in a region adjacent the first electrode, wherein no image is displayed in a region adjacent the black matrix.

10. The flexible display according to claim 1, further comprising:
   a gate line and a data line disposed on the first substrate such that the gate line and the data line intersect; and
   a thin film transistor formed at the intersection between the gate line and the data line, wherein the thin film transistor contacts the first electrode.

11. The flexible display according to claim 1, wherein the transparent electrolyte layer moves to a region between the first and second electrodes formed by an electric field, and the opaque non-electrolyte layer moves to a region between the first electrode and the black matrix.

12. A flexible display comprising:
   a first electrode disposed on a flexible substrate;
   a transparent insulating layer disposed adjacent an upper surface of the flexible substrate;
   a counter substrate disposed adjacent the flexible substrate;
   a second electrode and a black matrix disposed on a surface of the counter substrate adjacent the flexible substrate;
   a transparent electrolyte layer and an opaque non-electrolyte layer disposed between the flexible substrate and the counter substrate, wherein the transparent electrolyte layer passes an external light and the non-electrolyte layer shields the external light; and
   a reflection plate disposed adjacent a lower surface of the flexible substrate, wherein the reflection plate comprises different colors that correspond with sub-pixels.

13. The flexible display according to claim 12, wherein the first and second electrodes comprise a transparent conductive material.

14. The flexible display according to claim 12, wherein the transparent insulating material comprises a hydrophobic material.

15. The flexible display according to claim 12, wherein the transparent electrolyte layer and the opaque non-electrolyte layer move to a different region because of an electric field disposed between the first and second substrates.

* * * * *